US011170059B2

(12) United States Patent
Cardonha et al.

(10) Patent No.: US 11,170,059 B2
(45) Date of Patent: Nov. 9, 2021

(54) PERSONALIZED CONTENT SELECTION FOR TIME-CONSTRAINED SESSIONS

(71) Applicant: International Business Machines Corporation, Armonk, NY (US)

(72) Inventors: Carlos Henrique Cardonha, Sao Paulo (BR); Rogerio Abreu de Paula, Sao Paulo (BR); Nicole Barbosa Sultanum, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 15/084,804

(22) Filed: Mar. 30, 2016

(65) Prior Publication Data

US 2017/0286546 A1    Oct. 5, 2017

(51) Int. Cl.
*G06F 16/9535* (2019.01)
*G06F 16/2457* (2019.01)

(52) U.S. Cl.
CPC .... *G06F 16/9535* (2019.01); *G06F 16/24578* (2019.01)

(58) Field of Classification Search
CPC .......... G06F 17/30867; G06F 17/3053; G06F 16/9535; G06F 16/24578
See application file for complete search history.

(56) References Cited

U.S. PATENT DOCUMENTS

| | | | |
|---|---|---|---|
| 2001/0037379 A1* | 11/2001 | Livnat ................ | G06F 21/6218 709/219 |
| 2007/0226204 A1* | 9/2007 | Feldman ............ | G06F 17/3061 |
| 2008/0080396 A1* | 4/2008 | Meijer .................. | H04L 12/66 370/254 |
| 2009/0119004 A1* | 5/2009 | Choi ..................... | G06F 16/40 701/533 |
| 2009/0158342 A1* | 6/2009 | Mercer ................ | G06Q 30/02 725/46 |
| 2010/0095203 A1* | 4/2010 | Toebes ............... | G06F 17/2211 715/277 |
| 2011/0213894 A1* | 9/2011 | Silberstein ....... | G06F 17/30557 709/232 |
| 2011/0307411 A1* | 12/2011 | Bolivar .............. | G06F 16/9535 705/347 |
| 2013/0191374 A1* | 7/2013 | Aravamudan .... | G06F 17/30035 707/722 |

(Continued)

*Primary Examiner* — Alford W Kindred
*Assistant Examiner* — Lin Lin M Htay
(74) *Attorney, Agent, or Firm* — Harrington & Smith (57) ABSTRACT

A computer system selects a set of content for a user. The set of content has been selected from a larger set of content located on multiple sources on one or more networks. The selecting is performed based on a time constraint of the user, on a level of relevance to that user of each item of content in the larger set of content, and on an expected amount of time the user will spend consuming each item of content in the larger set of content. The sources of content were previously provided by the user and the level of relevance of the content and expected amount of time the user will spend consuming each item of content are estimated based on historical data for that user. The computer system sends the selected content toward a user device used by the user. Methods, apparatus, and computer program products are disclosed.

25 Claims, 4 Drawing Sheets

FIG.1

(56) References Cited

U.S. PATENT DOCUMENTS

| | | | |
|---|---|---|---|
| 2013/0191740 A1* | 7/2013 | Bell | G06F 16/9535 |
| | | | 715/273 |
| 2013/0262218 A1* | 10/2013 | Wang | G06Q 30/02 |
| | | | 705/14.43 |
| 2014/0100905 A1* | 4/2014 | Alexander | G06F 17/2235 |
| | | | 705/7.19 |
| 2014/0115181 A1* | 4/2014 | Wu | H04L 67/26 |
| | | | 709/231 |
| 2014/0324902 A1* | 10/2014 | Morris | G06F 16/9535 |
| | | | 707/766 |
| 2016/0314210 A1* | 10/2016 | Brunn | H04L 51/26 |
| 2017/0243171 A1* | 8/2017 | Bellamy | H04L 65/403 |

\* cited by examiner

PERSONALIZED CONTENT SELECTION FOR TIME-CONSTRAINED SESSIONS

BACKGROUND

The present invention relates to computer systems, and more particularly to computer systems that provide personalized content selection for time-constrained sessions.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Busy lives require good time management skills. One particular activity that is often squeezed in people's calendars is reading the latest news. A number of tools have been developed to support this. Such tools include Flipboard (a social-network aggregation, magazine-format application software), Google Now (an intelligent personal assistant developed by Google, which is a company providing search services), and Feedly (a news aggregator application for various web browsers and mobile devices).

Even by covering a reader's areas of interest, not all of the content in those areas will be of interest to that user, and so it often becomes a hit-or-miss kind of activity in which several or many pieces of content need to be browsed until one piece of interesting content is found.

It would be beneficial to address this issue.

SUMMARY

This section is intended to include examples and is not intended to be limiting.

A computer system selects a set of content for a user. The set of content has been selected from a larger set of content located on multiple sources on one or more networks. The selecting is performed based on a time constraint of the user, on a level of relevance to that user of each item of content in the larger set of content, and on an expected amount of time the user will spend consuming each item of content in the larger set of content. The sources of content were previously provided by the user and the level of relevance of the content and expected amount of time the user will spend consuming each item of content are estimated based on historical data for that user. The computer system sends the selected content toward a user device used by the user. Methods, apparatus, and computer program products are disclosed.

BRIEF DESCRIPTION OF THE SEVERAL VIEWS OF THE DRAWINGS

FIG. 2, which includes FIGS. 2A and 2B, is a logic flow diagram for personalized content selection for time-constrained sessions, and illustrates the operation of an exemplary method, a result of execution of computer program instructions embodied on a computer readable memory, functions performed by logic implemented in hardware, and/or interconnected means for performing functions in accordance with exemplary embodiments, where

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, not all of the content selected in a reader's areas of interest will be of interest to that user, and so it often becomes a hit-or-miss kind of activity in which several or many pieces of content need to be browsed until one piece of interesting content is found. A system and method are proposed herein to address this issue. The techniques proposed herein make the best out of a busy reader's time, by selecting, prioritizing, and presenting content tailored to his or her available time frames and personal interests.

For instance, embodiments herein provide a solution for productivity and time-management tools, aimed at, e.g., executives and individuals with strong time restrictions who depend on effective content selectors in order to consume the information they need in the (sparse) available time they have. As an example, a person spends 40 minutes commuting and wishes to have a selection of material that would be the best for this time period. An exemplary system herein will consider the content consumed in previous commutes, and the time spent on topics of interest (for instance, five minutes on political news, five minutes on sports news, and the remainder on the latest purchased electronic book) to balance the presentation of content to fit within the allotted time.

Thus, in an embodiment, a system and method are proposed for the selection of content extracted from multiple sources for an individual, aware of her time constraints and based on the level of relevance (to that user) of each piece of content. Sources of content are provided by the individual and content relevance is estimated based on historical data. More detailed description of exemplary embodiments is presented after an exemplary system is introduced in reference to FIG. 1.

Figure 1:
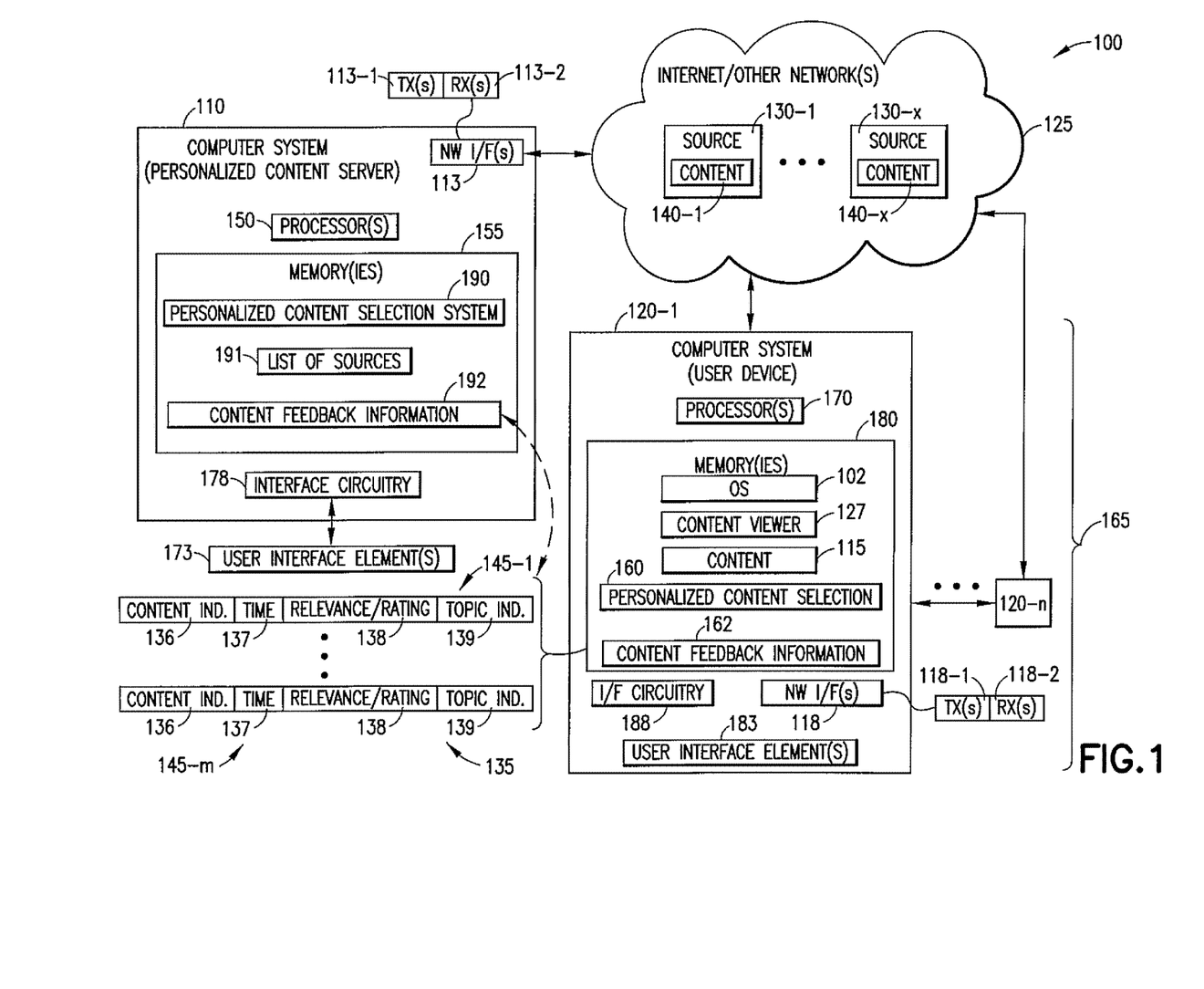
FIG. 1 illustrates an exemplary system used for personalized content selection for time-constrained sessions in an exemplary embodiment.

Turning to FIG. 1, this figure illustrates an exemplary system 100 used for personalized content selection for time-constrained sessions in an exemplary embodiment. FIG. 1 illustrates one possible example and there are many others, such as systems with webservers, application servers, and cloud applications and servers. The system 100 comprises the computer systems 110 and 120-1 through 120-*n*, which communicate in part via the network(s) 125. The computer system 110 is a computer system that performs personalized content selection for time-constrained sessions in this example. The computer systems 120 are user devices, which users use to access delivered content. A user is a human being that uses the user device.

In this example, there is a network 125, which includes sources (e.g., computer systems) 130-1 through 130-*x*, each having corresponding content 140-1 through 140-*x*. The content 130 is assumed to include multiple items of content.

There could be one network 125 or multiple networks 125. For instance, the network 125 could be or include a local area network (LAN), a wide area network (WAN), the Internet, or the "cloud", e.g., and one or more of the sources 130-1 through 130-x could be a webserver or a cloud-based server. Some or all of the sources 130 could also be "outside" the network(s) 125 and connected to the network(s) 125.

The computer system 110 comprises one or multiple processors 150, one or more multiple memories 155, interface circuitry 178, and one or more network (N/W) interfaces (I/F(s)) 113. The computer system 110 may include or be connected to one or more user interface elements 173. The one or more memories 155 comprise a personalized content selection system 190, the details of which are described below, a list of sources 191, and content feedback information 192. In brief, the personalized content selection system 190 performs personalized content selection for time-constrained sessions for users. The personalized content selection system 190 comprises functionality as described herein and comprises computer-readable code that, when executed by the one or more processors 150, cause the computer system 110 to perform the functionality described herein. The personalized content selection system 190 may also be implemented (in part or completely) as hardware, such as being internal to the one or more processors 150. The computer system 110 is also referred to as a personalized content server 110 herein, although it should be clear that a personalized content server is also a computer system. It is also noted that a "computer system" as this term is used herein may include multiple processors and memories, e.g., in a cloud-based system.

The computer system 150, as a personalized content server, may or may not have user interface elements 173, which could include a display, keyboard, mouse, and the like. A server, depending on implementation, may only be accessed remotely (e.g., via a network interface 113), and as such would not use the interface elements 173.

For ease of reference, it is assumed all of the computer systems 120 are similar, and a block diagram of possible internals of only one computer system 120 (shown as 120-1) is shown in FIG. 1. The computer system 120 comprises one or multiple processors 170, one or more multiple memories 180, interface circuitry 188, one or more network (N/W) interfaces (I/F(s)) 118, and one or more user interface elements 183. Although primary emphasis is placed herein on the computer systems 120 being mobile, wireless devices, this is not necessary. The computer systems 120 can be such mobile, wireless devices (e.g., smartphones, tablets, portable computers) or can be "fixed" computer systems such as personal computers, televisions, and the like. The computer systems 120 are also referred to herein as user devises 120, although each such user device is a computer system. The user devices 120 may include or be connected to the one or more user interface elements 183. The one or more memories 180 may comprise some or all of an operating system (OS) 102, a content viewer 127, content 115, a personalized content selection entity 160, and content feedback information 162. The OS 102 is a collection of software that directs a computer's operations, controlling and scheduling the execution of other programs, and managing storage, input/output, and communication resources. The content viewer 127 is an element that provides the user the ability to view the content 115, which has been sent to the user device 120 by the personalized content server 110 and is a (typically very small) subset of the content 140 on the sources 140. The personalized content selection entity 160 is a module that analyzes the use of the content 115 by a user, such as determining which parts of the content were viewed, how long each part took to view, and the like. The personalized content selection entity 160 can periodically send this information (illustrated as content feedback information 162) to the personalized content server 110, which can use this information to personalize further the content 115 for the user.

The user interface element(s) 183 of the user device 120 could be one or more of, e.g., a touch screen, wireless keyboard, motion sensors, mice, trackballs, and the like. In the example of a mobile, wireless user device 120, the user interface elements 183 would typically include a touch screen.

As one example, the content viewer 127 may be a web browser and the personalized content selection entity 160 could be a plugin to the web browser. As another example, the content viewer 127 and personalized content selection entity 160 can be combined into a single program, such as an "app", that can be used by a user for both viewing content 115 and determining content feedback information 162. In another example, the content feedback information 162 could be separate from the content viewer 127, such as being integrated into the OS 102, and the content viewer could be a web browser, an app (such as a book reading app), or the like. It is noted that the primary emphasis herein is placed on content that is text-based. However, the same concept can be directly applied to other types of media content, such as video, apart from text. Nonetheless, topic modeling techniques are applied to text herein, so some transcription should be associated with these other types of content.

The list of sources 191 is provided by a user (not shown until FIG. 3) and is a list of sources 130 from which the personalized content server 110 should determine relevant content 140 for the user. The content feedback information 192 is information determined by the personalized content server 110 (or the content activity information 162 on the user device 120). Such content feedback information 192 and/or content feedback information 162 may include a list 135 of entries 145-1 through 145-$m$, where each entry includes one or more of a content indicator 136, a time 137, a relevance/rating 138 and a topic indicator 139. The content indicator 136 is an indicator of the content 140, such as an HTML (hypertext markup language) link, an URL (uniform resource locator), name of a book (and perhaps other identifying information such as author, copyright date, and the like), or any other technique that uniquely identifies content. The time 137 is in an example a time period the user took to view the content 115 indicated by the content indicator 136. The relevance/rating 138 is assigned by the user to the content 115. For instance, the user may indicate that content 115 is or is not relevant, or may rate the content (e.g., the value one indicates the user disliked the content quite a bit, while the value five indicates the user liked the content very much, and the values two to four would be similarly on this scale, e.g., with three being "neutral"). The relevance/rating 138 could contain one or both of these or alternatively or additionally other systems. The topic indicator 139 indicates the topic, such as political news, sports news, technology news, electronic book (or category of book such as fiction or non-fiction and the like), and other similar subjects or themes. The content feedback information 162 and 192 may contain all of these entries 136, 137, 138, 139, and 145, or each may contain a subset of them. For instance, the content feedback information 162 may only use the content indication 136 and time 137 and the personalized content selection entity 160 would report these to the personalized content server 110. The user may also indicate the relevance/rating 136 while using the personalized content server 110, and the personalized content selection entity 160 would report this entity too.

The user devices 120 may form part of a user group 165. In this context, a user group 165 is a set of users that are provided access to the personalized content server 110 and receive information from the personalized content server 110.

It is noted that the letters m, n, and x have no meaning other than to indicate multiplicity. Additionally, FIG. 1 is shown mainly from a perspective of a single user. If multiple users are supported by the personalized content server 110, which is a typical case, there could be a list of sources 191 and content feedback information 192 for each of the users of the user devices 120.

The computer readable memories 155 and 180 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The computer readable memories 155 and 180 may be means for performing storage functions. The processors 150 and 170 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples. The processors 150 and 170 may be means for performing functions, such as controlling the computer systems 110 and 120, respectively, and other functions as described herein.

The network interfaces 113 and 118 may be wired and/or wireless and communicate over the Internet/other network(s) 125 via any communication technique. In this example, the network interfaces 113 and 118 comprise one or more transmitters 113-1 and 118-1, respectively, and one or more receivers 113-2 and 118-2, respectively. Such transmitters 113-1, 118-1 and receivers 113-2 and 118-2 can be wireless radio frequency (RF) transmitters or receivers supporting, e.g., cellular or local or wide area network frequencies and protocols. The transmitters or receivers may also be wired and support wired protocols such as USB (universal serial bus), networks such as Ethernet, and the like. There may also be a combination of these protocols used.

The user interface elements 173 and 183 may include, for instance, one or more of keyboards, mice, trackballs, displays (e.g., touch screen or non-touch screen), and the like. The computer systems 110 and 120 may be, e.g., personal computer systems, laptops, wireless devices such as smartphones and tablets, and "computer systems" formed in the cloud from multiple processors and memories.

Figure 2A:
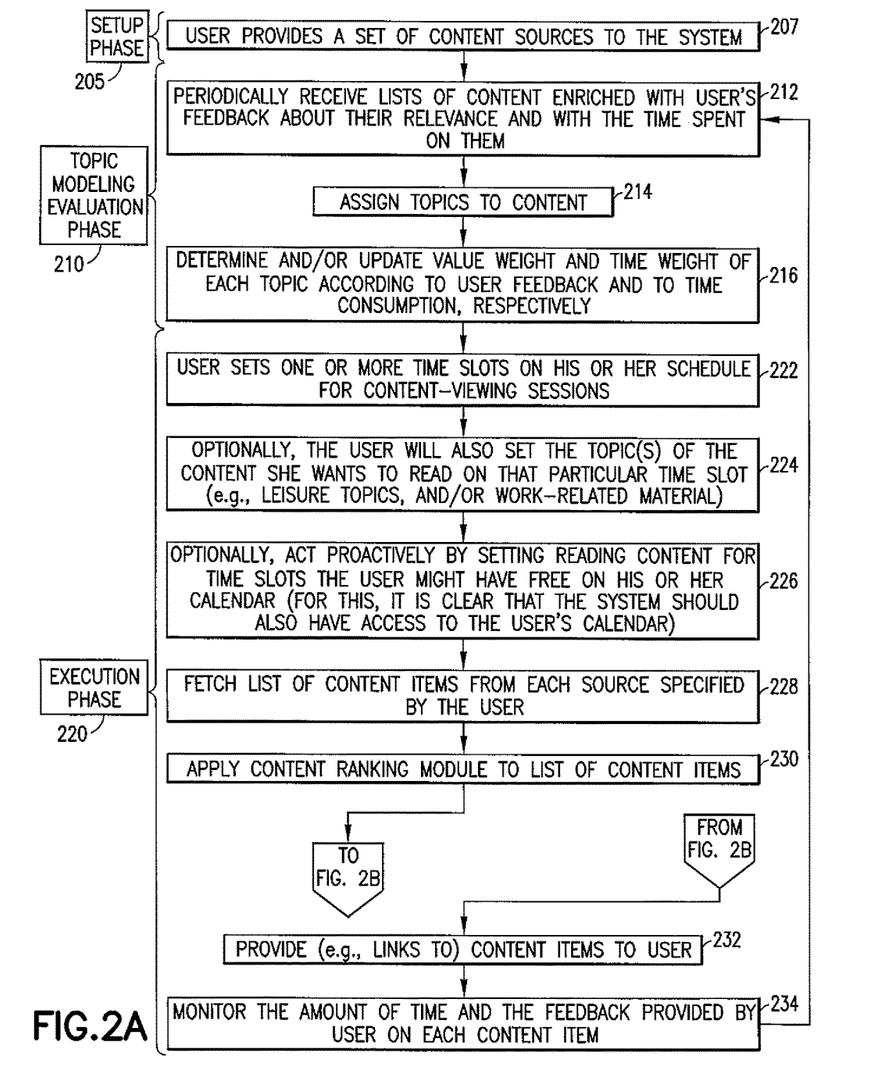
FIG. 2A illustrates a setup phase, a topic modeling evaluation phase, and an execution phase of the flow.
Figure 2B:
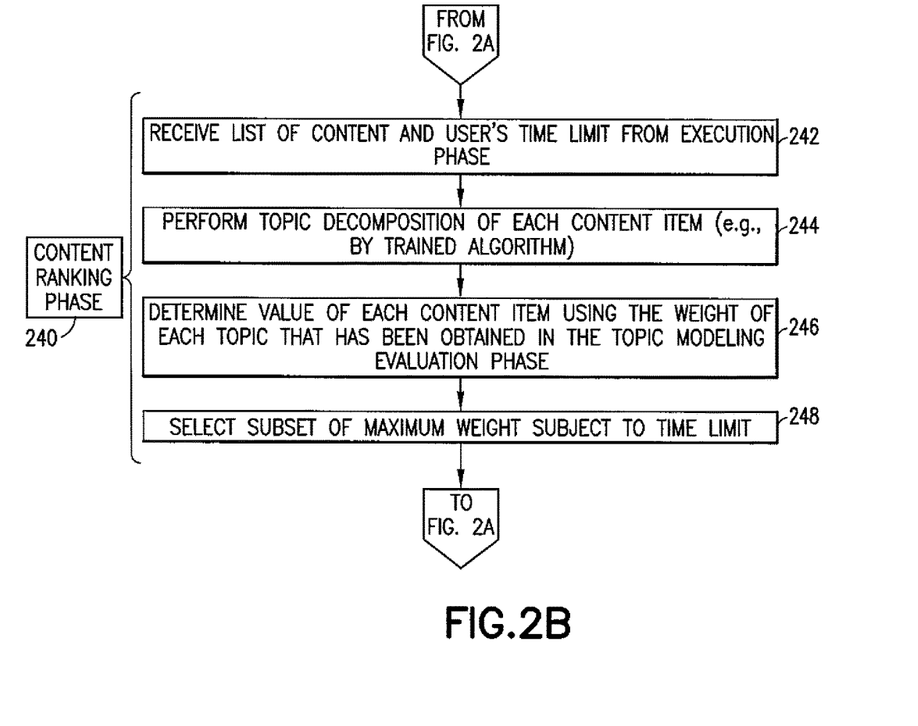
FIG. 2B illustrates a content ranking phase of the flow.

FIG. 2, which includes FIGS. 2A and 2B, is a logic flow diagram for personalized content selection for time-constrained sessions. This figure further illustrates the operation of an exemplary method, a result of execution of computer program instructions embodied on a computer readable memory, functions performed by logic implemented in hardware, and/or interconnected means for performing functions in accordance with exemplary embodiments. FIG. 2A illustrates a setup phase, a topic modeling evaluation phase, and an execution phase of the flow, and FIG. 2B illustrates a content ranking phase of the flow. Most of the blocks in FIG. 2 are performed by the personalized content server 110, e.g., under control at least in part by the personalized content selection system 190. A few blocks may be performed by the personalized content selection entity 160 or the user, and these are described below.

FIG. 2 is, as previously described, divided into multiple phases for ease of understanding and reference. There is a setup phase 205, a topic modeling evaluation phase 210, an execution phase 220, and a content ranking phase 240. In the setup phase 205, the user interacts with the personalized content server 110 to set up delivery of personalized content. For instance, in block 207, the user provides a set of content sources 130 to the personalized content server 110. The interaction could occur by the user logging into the personalized content server 110, e.g., through a webpage, and selecting content sources 130. As another example, the user might use a personalized content selection entity 160 on his or her user device 120 to log into a service for the personalized content server 110 and to select content sources 130. The personalized content selection entity 160 could then send indications of the selected content sources 130 to the personalized content server 110. Other options are also possible.

Blocks 212-216 form examples of the topic modeling evaluation phase 210. In block 212, the personalized content server 110 periodically receives lists of content enriched with, e.g., the user's feedback about their relevance and with the time spent on them. Such lists and enrichment might take the form of the content feedback information 162, and the list 135 illustrated in FIG. 1. For instance, the personalized content selection entity 160 could include a content indicator 136 and a time 137 in one or more messages to the personalized content server 110. As described above, the content indicator 136 is an indicator of the content 140, such as an HTML (hypertext markup language) link, an URL (uniform resource locator), name of a book (and perhaps other identifying information such as author, copyright date, and the like), or any other technique that uniquely identifies content. The time 137 is in an example a time period the user took to view the content 115. The personalized content selection entity 160 may also include one or both of a relevance/rating 138 and a topic indicator 139. As previously described, the relevance/rating 138 is assigned by the user to the content 115 indicated by the content indicator 136. For instance, the user may indicate that content 115 is or is not relevant, or may rate the content, as previously described. The relevance/rating 138 could contain one or both of these or alternatively or additionally other systems. The topic indicator 139 indicates the topic, such as political news, sports news, technology news, electronic book (or category of book such as fiction or non-fiction and the like), and other similar subjects or themes.

In block 214, the personalized content server 110 assigns topics to content 140 from sources 130. Note that block 214 can involve assigning weighted combinations of topics to content. For instance, a story may involve sports and finance (e.g., betting on a sporting event and possible fixing of the outcome of the event by athletes). At this point, the content 140 from sources 130 is being examined and organized by the personalized content server 110 for possible sending to the user in later steps.

In block 216, the personalized content server 110 determines and/or updates a value weight and a time weight of each topic according to user feedback and to time consumption, respectively. For instance, a higher value weight could be assigned to a topic based on a higher relevance/rating 138, or could be assigned based on a higher number of content that is viewed in a single session or multiple sessions during which the user is viewing content. For the time weight of each topic, a higher value could be assigned to topics where the time 137 is longer. For instance, if a user spends a lot of time 137 on multiple content items in one topic area, the value of the time weight of that topic would be higher (e.g., than if the user spends less time 137 on multiple content items in another topic area). As an additional example, block 216 is used to update the current relevance and time weights associated with topics based on user feedback on the most recent content she consumed (i.e., if the person took longer and enjoyed more a document involving sports than what was expected from her previously, both the time weight and the relevance weight of sports for this user are adjusted upwards).

Blocks 222 to 234 are examples of the execution phase 220. The execution phase 220 is where the user would like to have personalized content selected for him or her, based on time availability of the user and based on previous time consumption of content for the user. Thus, the personalized content server 110 could send more content to users who are fast readers and less to readers who are slow readers, for readers with the same time availability.

In block 222, the user sets one or more time slots on his or her schedule for content-viewing sessions such as reading sessions. The user could set these time slots by logging into personalized content server 110 and setting them using the server 110, or by using the personalized content selection entity 160 to select the one or more time slots (and the personalized content selection entity 160 would send indications of the time slots to the personalized content server 110). In block 224, optionally, the user will also set the topic(s) of the content she wants to read on that particular time slot (e.g., leisure topics, and/or work-related material). In block 226, optionally, the personalized content server 110 could act proactively by setting reading content for time slots the user might have free on his or her calendar (for this, it is clear that the system should also have access to the user's calendar).

In block 228, the personalized content server 110 fetches a list of content items (in content 140) from each source 130 specified by the user. The personalized content server 110, in block 230, applies a content ranking module to the list of content items. One example of the functions of a content ranking module is illustrated by the content ranking phase 240, described below.

In block 232, the personalized content server 110 provides content items to the user (e.g., as content 115), where the content items have been selected by the personalized content server 110 to meet the time availability in the time slots for the user and based on previous time consumption of content for the user. Also, note that in block 232, the personalized content server 110 could send links to the content items to the user, instead of sending the content items themselves to the user. As an additional example, some combination of links and content items may be sent, e.g., short articles (beneath some size limit) could be sent and links to longer articles/videos (above the size limit) could be sent. Each link is a reference to a location of an item of content 140 on a source 130.

Block 234 involves monitoring the amount of time and the feedback provided by user on each content item. This may be performed by the personalized content selection entity 160, which then would send this information (e.g., in a list 135 of entries 145 shown in FIG. 1) to the personalized content server 110. It should be noted that the user "consumes" the content during block 234, e.g., by viewing the content. It should be noted that if this content is being provided in real-time by a third-party entity (e.g., a streaming provider as a source 130), this third-party entity may collect this information as well. In terms of the flow of FIG. 2, the flow then proceeds back to block 212. It should also be noted that the feedback provided implicitly or explicitly by the user causes the personalized content server 110 modify its personalized content selection 160 over time. For instance, the topics being selected might change over time, as could, e.g., the complexity and/or length of the content. This is an improvement to the personalized content server 110, as the personalized content server 110 improves its output over time, and is an improvement in the entire system, as the user receives content more tailored to the user's current preferences.

In FIG. 2B, the content ranking phase 240 shown therein includes blocks 242-248. In this example, block 242 has the personalized content server 110 receiving a list of content and the user's time limit (e.g., defined by a time slot) from execution phase 220. In block 244, the personalized content server 110 performs topic decomposition of each content item (e.g., by a trained algorithm). For instance, a topic modeling algorithm determines which combination of topics is associated with a particular document: e.g., 76% sports, 24% politics. This information is delivered automatically by available topic modeling algorithms. The personalized content server 110 in block 246 determines a value of each content item using the weight of each topic that has been obtained in the topic modeling evaluation phase 210 (see block 216). The higher the weight, the more relevant the topic, and relevance is based on a combination of topics associated with the content. As a more specific example, with the results of block 216, one can estimate the relevance and time consumption of a certain content based on its topic composition, which are used in block 246. For instance, if a content has 76% of topic A and 24% of topic B, the weight of the content is given by the weighted average of the weights of topics A and B, where the weights are determined by the percentages (76% and 24% in this example).

In block 248, the personalized content server 110 selects a subset of maximum weight subject to the time limit. As an example, the system may estimate how much time the user will spend consuming each piece of content, and select a subset of content for consumption based on their relevance. Time consumption may be estimated based on the topic (e.g., certain individuals read content about politics faster than others) and optionally on other elements, such as size (e.g., number of words) of a document, word complexity/Lexile measure for a document, number of words deemed to be "complex" (on some scale) in a document, and the like. Note that these may be independent of the user (e.g., scores such as Lexile measures that are independent of particular readers and based only on the complexity of the document) or related to the user (e.g., based on history concerning how long the user has taken to reading documents on a topic), or based on some combination of these (e.g., a user usually reads documents in finance quickly, but documents in finance above a certain complexity level take longer for the user). So the complexity is basically reflected on the topic composition of the document. The flow proceeds from block 248 back to block 232.

Figure 3:
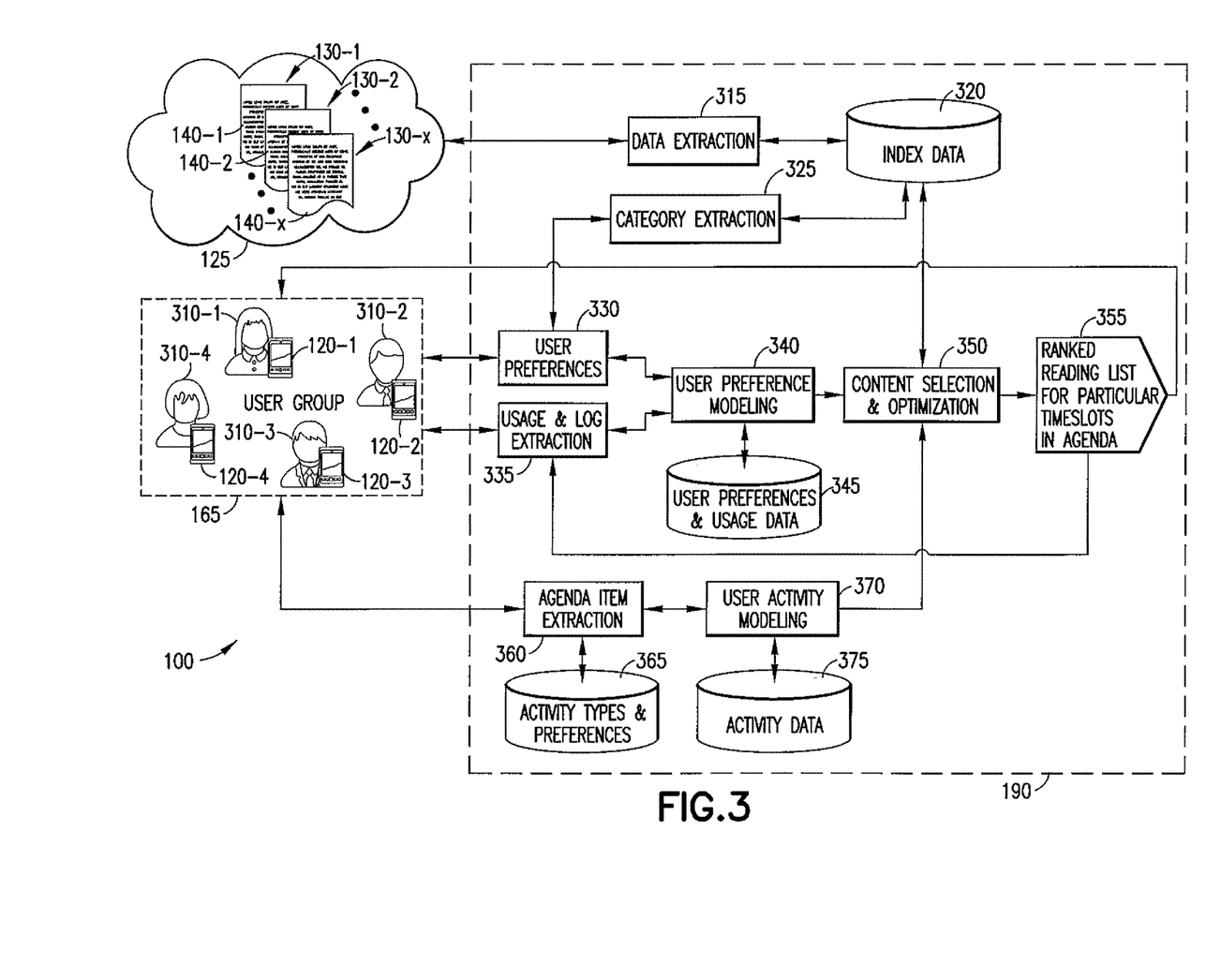
FIG. 3 illustrates another view of the exemplary system 100 in FIG. 1, used for personalized content selection for time-constrained sessions in an exemplary embodiment.

Referring to FIG. 3, this figure illustrates another view of the exemplary system 100 in FIG. 1, used for personalized content selection for time-constrained sessions in an exemplary embodiment. FIG. 3 illustrates how the personalized content selection system 190 might be divided into different parts that then interact to perform, e.g., the flow in FIG. 2.

Each one of the parts may be a program portion or a hardware portion and perform corresponding functions as described below.

The network(s) 125, with their sources 130 and corresponding content 140 are illustrations of the setup that occurs in blocks 205 and 207 of FIG. 2. The network(s) 125 are also illustrated as being connected to the data extraction part 315, which performs block 228 of FIG. 2, so that the data extraction part 315 fetch a list of content items from each source specified by the user. The data extraction part 315 reads data from and/or supplies data to the index data store 320, which provides indexes to the context 140.

The category extraction part 325 performs block 214 and assigns topics to content 140. The category extraction part 325 reads from or writes to the index data store 320 and also interacts with the user preferences part 330.

The user group 165 is illustrated in this example as having four users 310-1, 310-2, 310-3, and 310-4, each having a corresponding user device 120-1, 120-2, 120-3, and 120-4. The parts 330, 335, and 360 receive data from or transmit data to the users 310. The user preferences part 330 interacts with the category extraction part 325 and the user preference modeling part 340, and may be considered to perform block 216, determining and/or updating a value weight and a time weight of each topic according to user feedback (in this case, user preferences) and to time consumption, respectively. The usage & (and) log extraction part 335 may be considered to perform block 212 of FIG. 2. As such, the usage and log extraction part 335 periodically receives lists of content enriched with a user's feedback about their relevance and with the time spent on them.

Both parts 330, 335 also interact with the user preference modeling part 340, which helps to perform the topic modeling evaluation phase 210. The user preference modeling part 340 also reads from and writes to the user preferences and usage data store 345. The context selection and optimization part 350 can be considered to perform the content ranking phase 240 and/or block 230, applying a content ranking module to a list of content items. The content selection and optimization part 350 provides content items to the user (block 232), e.g., as indicated in part by reference 355, where a ranked reading list for a particular time slot (or time slots) in the agenda of the user 310 is provided to the user 310 and his or her user device 120. Actually, what matters most is the selection aspect: between selected material, a ranking is not really necessary (e.g., the algorithm making the selection may not work with ranks). Nevertheless, the system can establish a ranking between these elements according to their weights: i.e., given the set of selected items, the system can order them according to their weight. Data from reference 355 also gets fed back to the usage and log extraction part 335.

The agenda item extraction part 360 interacts with the user group 165 and performs block 222, allowing the user to set one or more time slots on his or her schedule for content-viewing sessions, and also may perform block 226, to optionally act proactively by setting reading content for time slots the user might have free on his or her calendar. The activity types and preferences store 365 may also include the data for block 224, where optionally the user will also set the topic(s) of the content she wants to read on that particular time slot. The agenda item extraction part 360 can also act on the data for block 224.

The user activity modeling part 370 interacts with the activity item extraction part 360 and the content selection and optimization part 350. The user activity modeling part 370 performs block 234, and monitors the amount of time and the feedback provided by a user 310 on each content item. The activity data store 375 contains the data for part 370.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   requesting by a user from a computer system a set of electronic content for consumption by the user within a time allotment;
   analyzing, by the computer system, a larger set of electronic content located on multiple sources on one or more networks by decomposing each item of the larger set to ascertain a level of relevance;
   determining, for each item meeting or exceeding the level of relevance, an expected amount of time for consumption;
   selecting the set of electronic content for consumption from items meeting or exceeding the level of relevance based on the expected amount of time for each item and the time allotment, a first portion of the selected electronic content being based at least in part on an estimation of time for consumption by the user that is independent of the user and determined from index data from user preference modeling, and a second portion of the selected electronic content being based at least in part on a user preference and determined from user data that is dependent on category extracted data determined from user feedback; and
   sending by the computer system the selected electronic content to a predetermined device of the user.

2. The method of claim 1, wherein the multiple sources of content were predetermined or previously provided by the user.

3. The method of claim 1, wherein the time allotment is based on at least one of the following:
   being set by the user;
   estimated by the computer system based on historical data of prior content consumed over prior time periods by the user; and
   a time slot indicated as being free on an agenda of the user, where the sending is performed by the computer system so the user has access to the set of content during the time slot indicated as being free on the agenda of the user.

4. The method of claim 1, wherein the level of relevance of the content is based on at least one of the following:
   being set by the user;
   estimated by the computer system based on historical data of prior content consumed over prior time periods by the user; and
   set by some indication associated with the content.

5. The method of claim 1, wherein each item of content in the larger set of content pertains to one or more topics.

6. The method of claim 5, wherein decomposing further comprises performing by the computer system topic decomposition of each content item to determine the one or more topics to which each item of content pertains, wherein the topic decomposition determines what percentage of each content item pertains to a topic.

7. The method of claim 6, wherein the ascertaining the level of relevance to the user of each item of content in the larger set of content comprises determining a value of each content item using a weight of each topic that has been previously obtained.

8. The method of claim 7, wherein determining a value of each content item using a weight of each topic that has been previously obtained further comprises applying for each topic in a content item a weight corresponding to the topic to the percentage to create a result and adding any results for each topic in the content item to determine the value.

9. The method of claim 6, wherein the method further comprises determining time weight of each topic based on feedback received from the user and determining the expected amount of time to consume each item of content by using the determined time weight of each topic by applying for each topic in a content item the time weight corresponding to the topic to the percentage to create a result and adding any results for each topic in the content item to determine a resultant value of time weight for the content item, and using the resultant values of time weights for determined of the expected times the user will spend consuming corresponding items of content.

10. The method of claim 9, wherein the expected amount of time for consumption is based on historical data for the measures for the user.

11. The method of claim 1, wherein sending by the computer system the selected content further comprises sending one or more links toward the user device, each link of the one or more links being a reference to an item of content on a source on the one or more networks.

12. The method of claim 1, wherein sending by the computer system the selected content further comprises sending at least one item of content in the set of content toward the user device.

13. A computer system, comprising:
a transmitter;
a memory comprising computer-readable code; and
one or more processors, wherein the one or more processors, in response to execution of the computer-readable code, cause the apparatus to perform at least the following:
requesting by a user from a computer system a set of electronic content for consumption by the user within a time allotment;
analyzing, by the computer system, a larger set of electronic content located on multiple sources on one or more networks by decomposing each item of the larger set to ascertain a level of relevance;
determining, for each item meeting or exceeding the level of relevance, an expected amount of time for consumption;
selecting the set of electronic content for consumption from items meeting or exceeding the level of relevance based on the expected amount of time for each item and the time allotment, a first portion of the selected electronic content being based at least in part on an estimation of time for consumption by the user that is independent of the user and determined from index data from user preference modeling, and a second portion of the selected electronic content being based at least in part on a user preference and determined from user data that is dependent on category extracted data determined from user feedback; and
sending by the computer system the selected electronic content to a predetermined device of the user.

14. The apparatus of claim 13, wherein the multiple sources of content were predetermined or previously provided by the user.

15. The apparatus of claim 13, wherein the time allotment is based on at least one of the following:
being set by the user;
estimated by the computer system based on historical data of prior content consumed over prior time periods by the user; and
a time slot indicated as being free on an agenda of the user, where the sending is performed by the computer system so the user has access to the set of content during the time slot indicated as being free on the agenda of the user.

16. The apparatus of claim 13, wherein the level of relevance of the content is based on at least one of the following:
being set by the user;
estimated by the computer system based on historical data of prior content consumed over prior time periods by the user; and
set by some indication associated with the content.

17. The apparatus of claim 13, wherein each item of content in the larger set of content pertains to one or more topics.

18. The apparatus of claim 17, wherein the decomposing comprises performing by the computer system topic decomposition of each content item to determine the one or more topics to which each item of content pertains, wherein the topic decomposition determines what percentage of each content item pertains to a topic.

19. The apparatus of claim 18, wherein ascertaining the level of relevance to the user of each item of content in the larger set of content comprises determining a value of each content item using a weight of each topic that has been previously obtained.

20. The apparatus of claim 19, wherein determining a value of each content item using a weight of each topic that has been previously obtained further comprises applying for each topic in a content item a weight corresponding to the topic to the percentage to create a result and adding any results for each topic in the content item to determine the value.

21. The apparatus of claim 17, wherein the one or more processors, in response to execution of the computer-readable code, further cause the apparatus to perform at least the following: determining time weight of each topic based on feedback received from the user and determining the expected amount of time to consume each item of content by using the determined time weight of each topic by applying for each topic in a content item the time weight corresponding to the topic to the percentage to create a result and adding any results for each topic in the content item to determine a resultant value of time weight for the content item, and using the resultant values of time weights for determined of the expected times the user will spend consuming corresponding items of content.

22. The apparatus of claim 21, wherein the expected amount of time for consumption is based on historical data for the measures for the user.

23. The apparatus of claim 13, wherein sending by the computer system the selected content further comprises sending one or more links toward the user device, each link of the one or more links being a reference to an item of content on a source on the one or more networks.

24. The apparatus of claim 13, wherein sending by the computer system the selected content further comprises sending at least one item of content in the set of content toward the user device.

25. A computer program product comprising a computer readable storage medium having program instructions embodied therewith, the program instructions executable by a computer system to cause the computer system to perform at least the following:
accepting input of a request by a user for the computer system to deliver to a user device a set of electronic content for consumption by the user within a time allotment;
analyzing, by the computer system, a larger set of electronic content located on multiple sources on one or more networks by decomposing each item of the larger set to ascertain a level of relevance;

determining, for each item meeting or exceeding the level of relevance, an expected amount of time for consumption;

selecting the set of electronic content for consumption from items meeting or exceeding the level of relevance based on the expected amount of time for each item and the time allotment, a first portion of the selected electronic content being based at least in part on an estimation of time for consumption by the user that is independent of the user and determined from index data from user preference modeling, and a second portion of the selected electronic content being based at least in part on a user preference and determined from user data that is dependent on category extracted data determined from user feedback; and sending by the computer system the selected electronic content to a predetermined device of the user.

* * * * *